US00RE39618E

(19) United States
(12) Reissued Patent
Levine

(10) Patent Number: US RE39,618 E
(45) Date of Reissued Patent: May 8, 2007

(54) REMOTE, AIRCRAFT, GLOBAL, PAPERLESS MAINTENANCE SYSTEM

(76) Inventor: Seymour Levine, 4928 Maytime La., Culver City, CA (US) 90230

(21) Appl. No.: 10/004,429

(22) Filed: Oct. 25, 2001

Related U.S. Patent Documents

Reissue of:
(64) Patent No.: 5,974,349
Issued: Oct. 26, 1999
Appl. No.: 09/205,331
Filed: Dec. 4, 1998

U.S. Applications:

(63) Continuation of application No. 08/768,313, filed on Dec. 17, 1996, now Pat. No. 5,890,079.

(51) Int. Cl.
*G06F 19/00* (2006.01)

(52) U.S. Cl. ..... 701/29; 701/14; 701/35; 340/945

(58) Field of Classification Search ..... 701/14, 701/29, 35, 120, 301; 340/945, 961, 963, 340/971; 342/29, 454, 36–38, 455, 456
See application file for complete search history.

(56) References Cited

U.S. PATENT DOCUMENTS 4,104,638 A 8/1978 Middleton
4,706,198 A 11/1987 Thurman
4,729,102 A * 3/1988 Miller et al. ..... 701/14
4,816,828 A * 3/1989 Feher ..... 340/945
5,067,674 A 11/1991 Heyche et al.
5,111,400 A 5/1992 Yoder
5,153,836 A * 10/1992 Fraughton et al. ..... 701/301
5,200,902 A 4/1993 Pilley
5,265,024 A 11/1993 Crabill et al.
5,278,891 A 1/1994 Bhagat et al.
5,325,302 A * 6/1994 Izidon et al. ..... 701/301
5,351,194 A 9/1994 Ross et al.
5,381,140 A 1/1995 Kuroda et al.
5,383,133 A * 1/1995 Staple ..... 700/280
5,392,052 A 2/1995 Eberwine
5,408,515 A 4/1995 Bhagat et al.
5,440,544 A 8/1995 Zinser, Jr.

(Continued)

*Primary Examiner*—Gary Chin
(74) *Attorney, Agent, or Firm*—Fred H Holmes

(57) ABSTRACT

This invention is a system that monitors many performance parameters and many aircraft operational parameters, and broadcasts this information along with aircraft identification, audio, video, global positioning and altitude data, to a world wide two-way rf network. This information is monitored and recorded at a remote, centralized location. At this location, this information is combined with archived data, ATC data, weather data, topological data, map data, and manufacturers' data. Analysis of this combined data allows identification of problems and generation of advisories. Six types of advisories are generated: maintenance, safety of flight, flight efficiency, flight separation, safe to fly and safe to take off. In the event of a crash the remotely recorded data provides an instant indication of the cause of the crash as well as where the crashed plane can be found. Use of this invention allows replacement of the current, on-board flight data recorders thus saving costs and weight. Having the recorded data at a remote site eliminates the need to search for flight data recorders. Other advantages are back-up for ATC radar position data, better control of aircraft separation, improved flight efficiency, and allowing use of simpler and lower power radar.

16 Claims, 4 Drawing Sheets

U.S. PATENT DOCUMENTS 5,459,469 A 10/1995 Schuchman et al.
5,463,656 A * 10/1995 Polivka et al. ..... 375/130
5,467,274 A * 11/1995 Vax ..... 701/14
5,493,309 A * 2/1996 Bjornholt ..... 342/455
5,506,587 A 4/1996 Lans
5,548,515 A 8/1996 Pilley et al.
5,570,095 A 10/1996 Drouilhet, Jr. et al.
5,574,648 A 11/1996 Pilley
5,587,904 A * 12/1996 Ben-Yair et al. ..... 701/213
5,627,546 A 5/1997 Crow
5,651,050 A 7/1997 Bhagat et al.
5,657,009 A * 8/1997 Gordon ..... 340/968
5,670,961 A 9/1997 Tomita et al.
5,677,841 A * 10/1997 Shiomi et al. ..... 701/120
5,703,591 A 12/1997 Tognazzini
5,712,628 A 1/1998 Phillips et al.
5,714,948 A * 2/1998 Farmakis et al. ..... 340/961
5,740,047 A * 4/1998 Pilley et al. ..... 701/120
5,798,458 A 8/1998 Monroe
5,798,726 A 8/1998 Schuchman et al.
5,831,575 A 11/1998 Gu
5,872,526 A 2/1999 Tognazzini
5,883,586 A 3/1999 Tran et al.
5,890,079 A * 3/1999 Levine ..... 701/14
5,931,877 A * 8/1999 Smith et al. ..... 701/29
5,950,129 A 9/1999 Schmid et al.
6,009,356 A 12/1999 Monroe
6,047,165 A * 4/2000 Wright et al. ..... 455/66.1
6,092,008 A * 7/2000 Bateman ..... 701/14
6,108,523 A * 8/2000 Wright et al. ..... 455/66.1
6,122,570 A 9/2000 Muller et al.
6,308,045 B1 * 10/2001 Wright et al. ..... 455/431

* cited by examiner

REMOTE, AIRCRAFT, GLOBAL, PAPERLESS MAINTENANCE SYSTEM

Matter enclosed in heavy brackets [ ] appears in the original patent but forms no part of this reissue specification; matter printed in italics indicates the additions made by reissue.

This application is a continuation of application Ser. No. 08/768,313 filed Dec. 17, 1996 and now allowed as U.S. Pat. No. 5,890,079.

BACKGROUND OF THE INVENTION

This invention relates to the field of flight recorders and more particularly to automatic, real-time, collection of aircraft data and then transmission of such data to a world wide communication system for subsequent reception, analysis, storage and generation of aircraft flight, safety, fuel efficiency and maintenance advisories at a Central Ground Based Processing Station (CGBS).

Whenever an airplane crashes, authorities are anxious to find the flight data recorder. This is because it may reveal the causes of the crash. It is important to determine the cause because it may result from a problem affecting many flying aircraft. The flight data or crash recorder, sometimes also called a black box, is usually a tape recorder which is capable of recording many channels of information. However, recorders utilizing other storage media, such as compact discs are starting to be used because of their increased storage capacity. Regardless of storage medium used, the information recorded includes various flight parameters, such as engine status, fuel status, airspeed, position, altitude, attitude, control settings, and cockpit acoustic information. The information comes from sensors in the cockpit and at other strategic locations around the airplane. However, the information stored by the data recorder is often discarded shortly after each flight. If all flight data were analyzed in conjunction with weather, air traffic control (ATC) data and map data, they could become a valuable resource for detecting potential problems and improving aircraft design.

Sometimes it is difficult to locate the crashed plane, and, even where the crash site is known, it is sometimes difficult to locate the flight data recorder. The latter is frequently a problem when the airplane crashes in water.

To fulfil their intended purpose, current flight data recorders must be made crash resistant. Consequently, they are constructed of rugged materials which means that they are costly to produce and heavy. Use of a lighter flight data recorder would result in an aircraft cost and weight savings.

Moreover, except for occasional post flight analysis, current, recorded flight data exists in a vacuum. If they were analyzed in conjunction with weather data, manufacturer's data, map data, ATC data and position and altitude data, it would become a much more powerful tool.

In recent years there have been a number of developments in flight data recorders. U.S. Pat. No. 4,729,102 discloses a flight data recorder system which monitors a number of aircraft parameters and compares them to stored information to provide for more efficient aircraft operation and detection of excessive wear. This information is displayed and stored on-board and may be downloaded periodically via a link to a ground readout unit.

U.S. Pat. No. 5,463,656 discloses a system for broadcasting full broadcast quality video to airplanes in flight via satellite relays. The system includes video bandwidth compression, spread spectrum waveform processing and an electronically steered, circular aperture, phased array antenna, that conforms to the surface of the aircraft.

U.S. Pat. No. 5,467,274 discloses a method of recording selected flight data, including GPS data, onto a VTR and thereafter subjecting the recorded data to a data reduction process on the ground.

U.S. Pat. No. 5,325,302 discloses an aircraft collision warning system which includes a position determining subsystem, a trajectory determining subsystem, a collision predicting subsystem and a warning device.

U.S. Pat. No. 5,383,133 discloses a computerized, integrated, health monitoring and vibration reduction system for a helicopter.

However, none of these developments contemplates long term central storage of all recorded information for archival uses. Also none contemplates real-time radio transmission of aircraft data to a central station. Furthermore, none contemplates combining information from aircraft with global position data, global map data, global weather data, ATC system data and manufacturers' data and providing real-time feedback, in the form of real-time ground and in-flight advisories to aircraft.

What is needed is a flight recorder system that senses many flight parameters and many aircraft operational parameters, and transmits this information along with aircraft identification and cockpit audio and video to a world wide, two-way radio frequency (rf) network. This information could then be monitored and safely recorded at a remote location where it could be analyzed in conjunction with archived data, flight control data, weather data, topological data, global positioning data and manufacturers' data to allow identification of maintenance problems, on-ground safety advisories and in-flight safety advisories. There are three types of in-flight advisories: emergency or safety of flight, flight efficiency or fuel economy, and flight separation. On the ground there are also three types of advisories: safe to fly, safe to take off and maintenance actions.

In the event of a crash having the recorded data at a remote site would eliminate the need to search for flight data recorders and allow instant analysis of the failure mode. Further, the remotely recorded data would provide the best estimate of where the crashed plane could be found. This estimate would be based on the aircraft's last telemetry of its position, engine and control status, its flight dynamics and ATC radar data (when available). Use of this invention would allow replacement of the current, on-board flight data recorders thus saving costs and weight. Other advantages would be back-up for radar position data, better control of aircraft separation, and improved flight efficiency. Development of a such a system represents a great improvement in the fields of flight data recorder design, aircraft safety and airline efficiency, and satisfies a long felt need of airplane manufacturers, airlines, maintenance personnel and crash investigators.

SUMMARY OF THE INVENTION

The present invention is a remotely located, aircraft, flight data recorder and advisory system. These functions are achieved by continuously monitoring aircraft sensors such as aircraft position, altitude, speed, control surface settings, engine revolutions per minute, temperatures, stress, and fuel. Then by rf world wide transmission, such as via satellite communication links, these parameters are communicated, along with cockpit audio data, video data, aircraft identification and configuration, to a central ground based monitoring station where they are continually and safely recorded and analyzed. The transmission of the aircraft data via the communication link permits the aircraft performance and cockpit communication data to be memorized in a ground based recorder for after crash analysis without the necessity of rugged and waterproof monitoring apparatus aboard the aircraft. Also, in the event of a pilot initiated or ground station initiated alert, based on the real-time automated analysis of the aircraft's flight worthiness, a pilot crash avoidance safety advisory can be radioed back to the aircraft that provides the pilot with expert advice as to the safest approach for the operation of the aircraft.

The central ground based monitoring system utilizes the real-time aircraft sensor data, aircraft configuration data and experts familiar with the aircraft in arriving at the best safety advisory. The computational analysis processors used to perform the safety analysis on the ground are not limited by the space and power restrictions that exist aboard the aircraft and thus can provide high fidelity simulation and analysis of the aircraft's problem. In this mode of operation, the central, ground based monitoring site maintains communication, utilizing fiber optic ground or satellite links, with flight controller facilities and with the aircraft manufacturers. It distributes the aircraft sensor data to them in real-time so as to solicit their expert analysis and help in generating the crash avoidance advisories. Real-time analysis of the pre-flight aircraft data along with other data such as weather, airport and its local area map, three dimensional topographical map information, from data bases such as Digital Terrain Elevation Data (DTED), ATC data, wind shear, and aircraft configuration are also used to provide a safe to take off advisory.

In addition to the above, if an aircraft exhibits a mechanical equipment failure prior to take off, the aircraft's sensor monitoring data are also communicated back to the aircraft manufacturer in real-time. The aircraft manufacturer then provides the mechanics with a preferred maintenance advisory based on an expert system for fault isolation that will save both time and money in getting a safe to fly aircraft back in service.

For aircraft that are equipped to receive the satellite constellation Global Positioning System (GPS) or the Global Navigation Satellite System (GLONASS) precision navigation signals, these real-time sensor data of aircraft location are transmitted to the CGBS. This very accurate aircraft position data is utilized to augment the ATC in-flight and airport taxi collision avoidance systems as well as to enhance the all weather landing systems. It provides the air traffic controllers' ground based radar systems with a level of redundancy and enhances the radar systems by providing high fidelity, three dimensional, world wide aircraft separation distances. This eliminates five deficiencies in the current radar ATC systems:

a. invisibility of small aircraft due to minimal radar cross-section;

b. distinguishing multiple aircraft flying close to each other because of beam width ambiguity;

c. beam shadowing problems;

d. range problems; and e. earth curvature problems.

An added economic benefit of utilizing this position data blended with other aircraft sensor information and world wide weather and destination airport traffic data available at the CGBS is to provide the aircraft with a real-time fuel conservation and economy of flight information. The world wide communication up link advisory to the aircraft during flight for fuel conservation and economy of flight operation is based on the blending of the data sources in a ground based digital processor. Thus, for this additional function, there is no need for added equipment to be carried aboard the aircraft. It also allows for simpler, lower cost and lower power ATC radar.

In the event of a crash, the aircraft sensor data stored at the CGBS, which has a record of the opening condition of the aircraft at the time of the crash, provides the best estimate of the downed aircraft's location for timely recovery and potential rescue operations as well as the parameters that may have caused the crash. Furthermore, for operational aircraft experiencing an equipment failure or in a potentially over-congested area of operation, the real-time expert advisories communicated to the aircraft may well prevent the loss of life by giving the pilot the best crash avoidance information. In addition post-flight analysis of aircraft data may provide clues to the cause of a problem so as to prevent its recurrence in the future. Even for operational aircraft experiencing no current faults, the CGBS keeps a record of flight hours accumulated on the airframe and critical parts to assure that routine maintenance is timely performed and that the vehicle does not accumulate excessive stress build-up on flight critical assemblies. The CGBS sends out alerts for maintenance actions.

The system integrates voice, video and instrument data into a single aircraft telemetry system that provides two way, world wide communication with the aircraft, and ground based archival recording of the data. For maintenance actions, it also communicates, via a local computer terminal or visor display to the aircraft ground maintenance personnel, the problem specific, vehicle aircraft manual data that shows how best to service the vehicle. This eliminates much of the paper manuals and assures that the latest aircraft maintenance information is being utilized for repair. It also provides an expert fault isolation system that saves both time and money in getting a safe to fly aircraft back in service.

An appreciation of the other aims and objectives of the present invention and an understanding of it may be achieved by referring to the accompanying drawings and description of a preferred embodiment.

DETAILED DESCRIPTION OF THE PREFERRED EMBODIMENT

Figure 1:
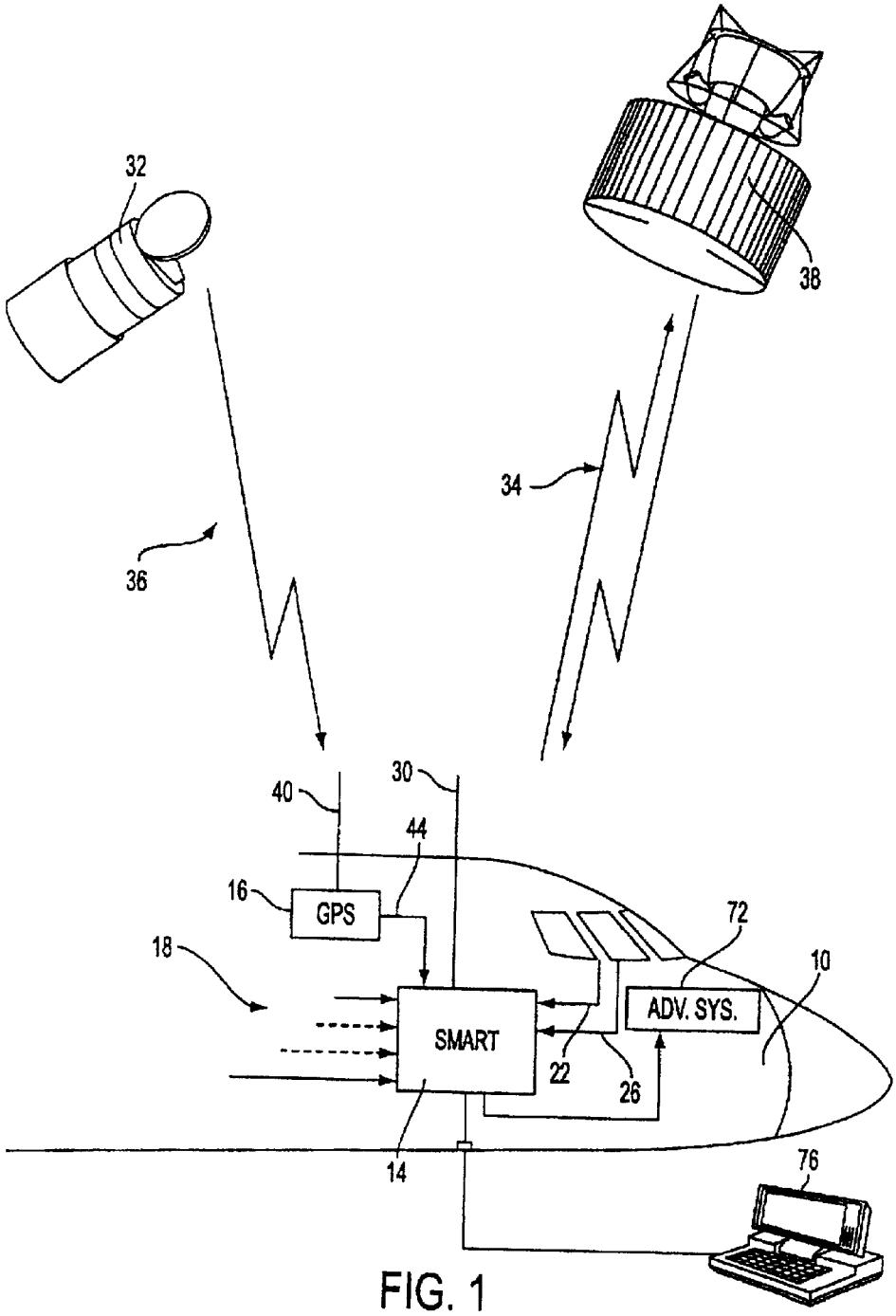
FIG. 1 is a block schematic of an aircraft's multiplexed flight sensors, sensor transmitter and advisory receiver according to the invention.

FIG. 1 shows an aircraft 10 equipped with a Sensor Multiplexer Receiver & Transmitter (SMART) 14 which is a line replaceable unit. The aircraft is also equipped with a GPS receiver system 16. The GPS system 16 receives ultra high frequency (uhf) radio signals 36 from several GPS satellites 32 via its GPS antenna 40, calculates the position and altitude of the aircraft 10 and reports this position and altitude data 44 to the SMART 14. The SMART 14 also receives aircraft performance and control data 18, acoustic data 22, and video data 26. The video data 26 comes from cameras which monitor the cockpit, the passenger compartment, and the cargo compartment. SMART 14 periodically samples the sensor signals 18,22,26,44 converts all non-digital sensor signals 18,22,26,44 into digital format, adds a sensor identification label to each signal 18, 22, 26, 44 plus an aircraft identification and configuration label. Then the SMART 14 ultra high frequency radio electronically modulates the combined data and sends them to the aircraft satellite telemetry antenna 30. It should be noted that, to save weight, one antenna could serve the functions of the GPS antenna 40 and the aircraft satellite telemetry antenna 30. Then this uhf signal is transmitted by the aircraft antenna 30 to an earth orbiting communication satellite 38 this is located in a direct, unobstructed, line of sight with the aircraft 10. In addition to transmitting data, the SMART 14 receives data from the satellite 38. As will be described more fully below, this data is mostly in the form of advisories and alerts. Such advisories and alerts are reported to the crew via an on-board advisory system 72. While the aircraft 10 is on the ground, maintenance advisories can be requested and viewed via a plug-in terminal 76.

Figure 2:
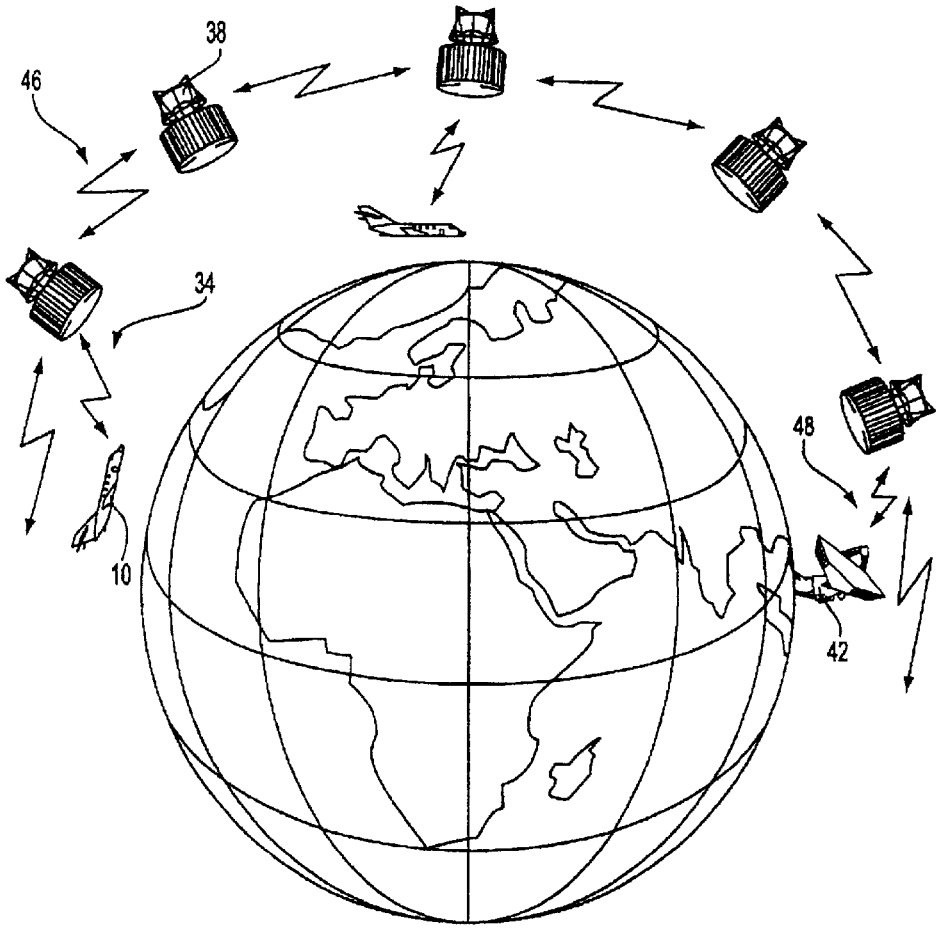
FIG. 2 illustrates worldwide communication via a satellite system and CGBS.

FIG. 2 illustrates the communication satellite link 34, 46, 48 between the aircraft 10 and the CGBS 42. It shows SMART 14 equipped aircraft 10 transmitting their sensor data over an uhf radio, unobstructed line of sight, transmission 34 to the closest communication satellite 38. The satellite, world wide communication link then relays the data by line of sight transmission 46 to other communication satellites 38 followed by line of sight transmission 48 to the CGBS 42. The transmission of aircraft advisories from the CGBS 42 to the aircraft 10 is accomplished by communicating along the same path but in the reverse direction. FIG. 2 depicts a continuous, around the clock, world wide communication link 34, 46, 48 that provides two way communication with all of the aircraft 10 equipped with SMART 14 in the Remote Aircraft Flight Recorder And Advisory (RAFT) System 50. The number of satellites 38 in the communication system depends on whether a geosynchronous or low earth orbit (LEO) satellite constellation is utilized. The system will work with either of the satellite constellations. The LEO constellation requires smaller, lighter and lower power equipment but a larger number of satellites.

Figure 3:
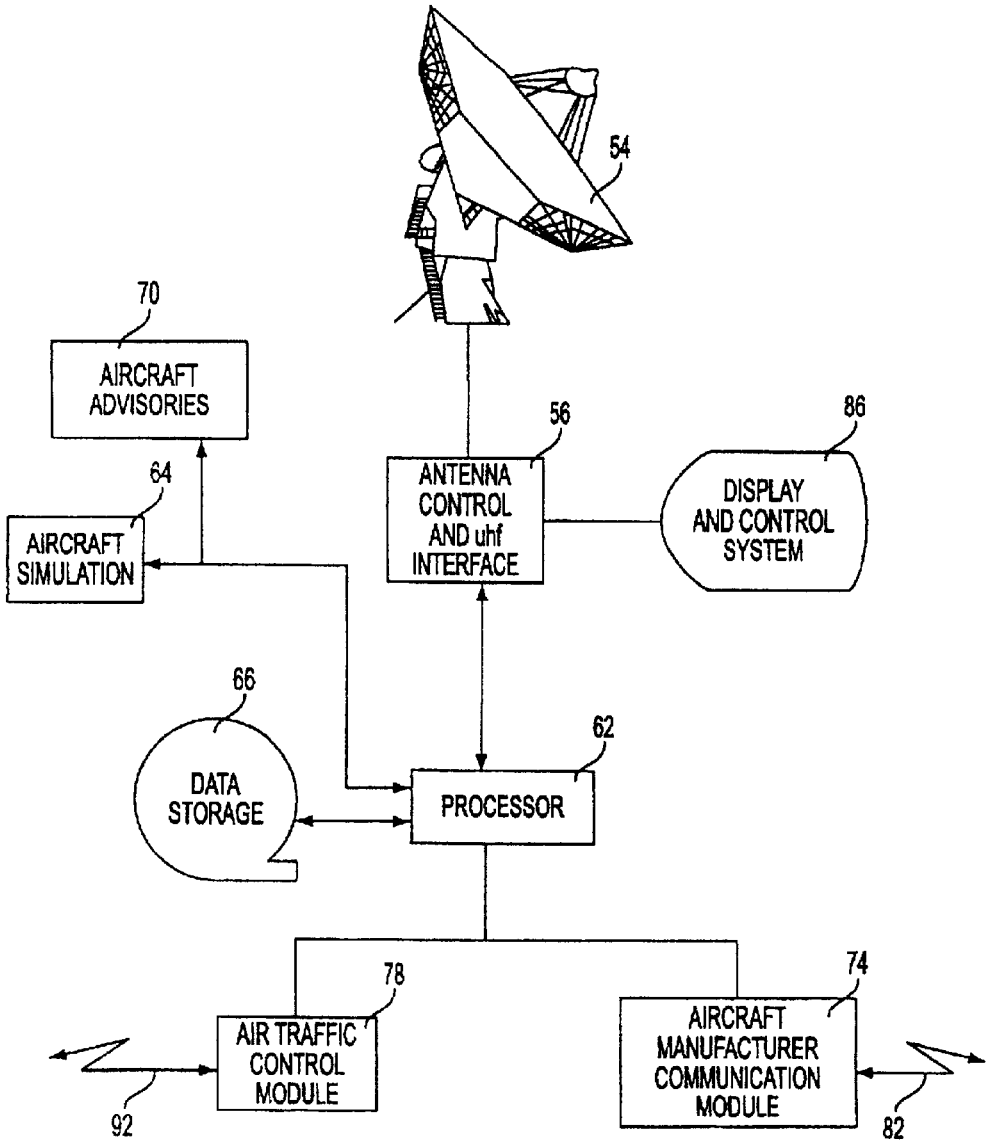
FIG. 3 is a block schematic of the CGBS according to the invention.

FIG. 3 is a block diagram of the CGBS 42. It shows the CGBS receiving and transmitting antenna 54, and the antenna control and uhf interface 56 that converts the received satellite signal into an electrical signal. The received signal represents aircraft performance and control 18, audio 22, video 26, and high accuracy position and altitude data 44. These signals are then sent to: the CGBS processing station 62 for data analysis, and performance and problem simulation; the expert system module 64 for crash avoidance simulations; the archive 66 for data storage; the advisory module 70 for generating aircraft advisories; the aircraft manufacturer's module 74 for distribution to the aircraft manufacturer's ground based facilities for expert crash avoidance and maintenance advisories; and the ATC module 78 for distribution to airport and area ATC facilities. Since the CGBS 42 is on the ground its temperature, environment, humidity and air can be readily controlled so that the archive storage of the aircraft's sensor data 18, 22, 26, 44 is very reliable. In addition, the real-time analysis of the data will alert the operational aircraft 10 of problems. In some cases, this may occur prior to the pilot's recognition of a problem. Thus in addition to reducing the equipment aboard the aircraft it can lighten the pilot's work load.

Ground communication can be made over wide bandwidth, fiber optic cables, satellites or other rf communication links. In the continental United States the wide band-width, fiber optic communication link is preferred. The CGBS 42 acts as communication concentrator and it is through this facility 42 that world wide communication with the aircraft 10 occurs. At this facility 42 weather data is collected from the government weather bureau facilities. The weather data, map data, DTED and ATC data is also combined with other aircraft operational data 18, 22, 26, 44 to provide: emergency or safety of flight advisories, flight efficiency or fuel economy advisories, and flight separation advisories.

FIG. 2 and 3 show how the closest, unobstructed line-of sight satellite 38 receives the data 18, 22, 26, 44 from aircraft 10 equipped with SMART modules 14. Data travels over the system to the satellite 38 closest to the CGBS 42. This satellite 38 is in line of sight communication with the CGBS 42, which transmits and receives data to and from the CGBS antenna 54. The antenna 54 is controlled by antenna control and uhf interface module 56. The uhf signals 18, 22, 26, 44 are also demodulated and sorted, by aircraft, in this module 56. The data 18, 22, 26, 44 is then sent to the ground processor 62 for analysis.

One function of the ground processor 62 is to send the data 18, 22, 26, 44 to the archival data storage system 66 where it is safely stored in an air conditioned environment, for future retrieval, on magnetic disc or tape, or optical memory. Another function of the processor 62 is to coordinate its data with the aircraft simulation processor 64. This processor 64 performs an expert system analysis based on past performance, i.e. archived, data, aircraft specific stress accumulation statistics and world wide weather and wind shear, DTED and ATC information. Based on this simulation, aircraft real-time advisories are generated by the advisory module 70. Emergency advisories are also based on the aircraft manufacturer's simulations conducted at their facilities and communicated to the CGBS 42 via the wide band-width, fiber optic link 82. The data can be viewed and controlled by the CGBS operators on the display and control system 86. The position, altitude and aircraft velocity data is also sent to the ATC module 78 for real-time transmission to the airport and area flight controllers over the wide bandwidth, fiber optic communication link 92.

Weather data from weather services are also communicated over this link 92. This data when mixed with the aircraft sensor data 18,22,26,44 at the aircraft simulation module 64 provide world wide safety of flight trajectories, safe to take off and land, and fuel efficiency economy of flight advisories. These advisories are sent to the aircraft 10 over the world wide communication link illustrated in FIG. 2. In addition, world wide advisories are sent to the aircraft 10 by the ATC based on their information for aircraft separation. In a similar manner, the aircraft data 18, 22, 26, 44 is sent to aircraft manufacturer personnel by the communication module 74 over the wide band-width, fiber optic link 82.

Advisories can be sent by the manufacturers providing the best way to handle problems based on their expert knowledge of the aircraft 10. These aid in safely flying the aircraft or efficiently servicing an aircraft that is experiencing equipment malfunctions on the ground. The in-air safety of flight advisories go to the advisory center 70 to be integrated with CGBS and air traffic controller generated information so as to provide a single emergency advisory, based on all of the data. This advisory is sent to the aircraft 10 via the global communication network. For aircraft experiencing problems on the ground, an aircraft manufacturer remotely samples the aircraft's performance and then sends advisories over the network to the aircraft's ground maintenance personnel.

These advisories represent the latest diagnostic procedures and problem specific maintenance information. These maintenance advisories are sent to an aircraft maintenance terminal display 76 that interfaces with the SMART communication system 14 on board the aircraft. Thus the maintenance advisory provides efficient, safe and effective repair of the aircraft using the most up-to-date procedures.

Figure 4:
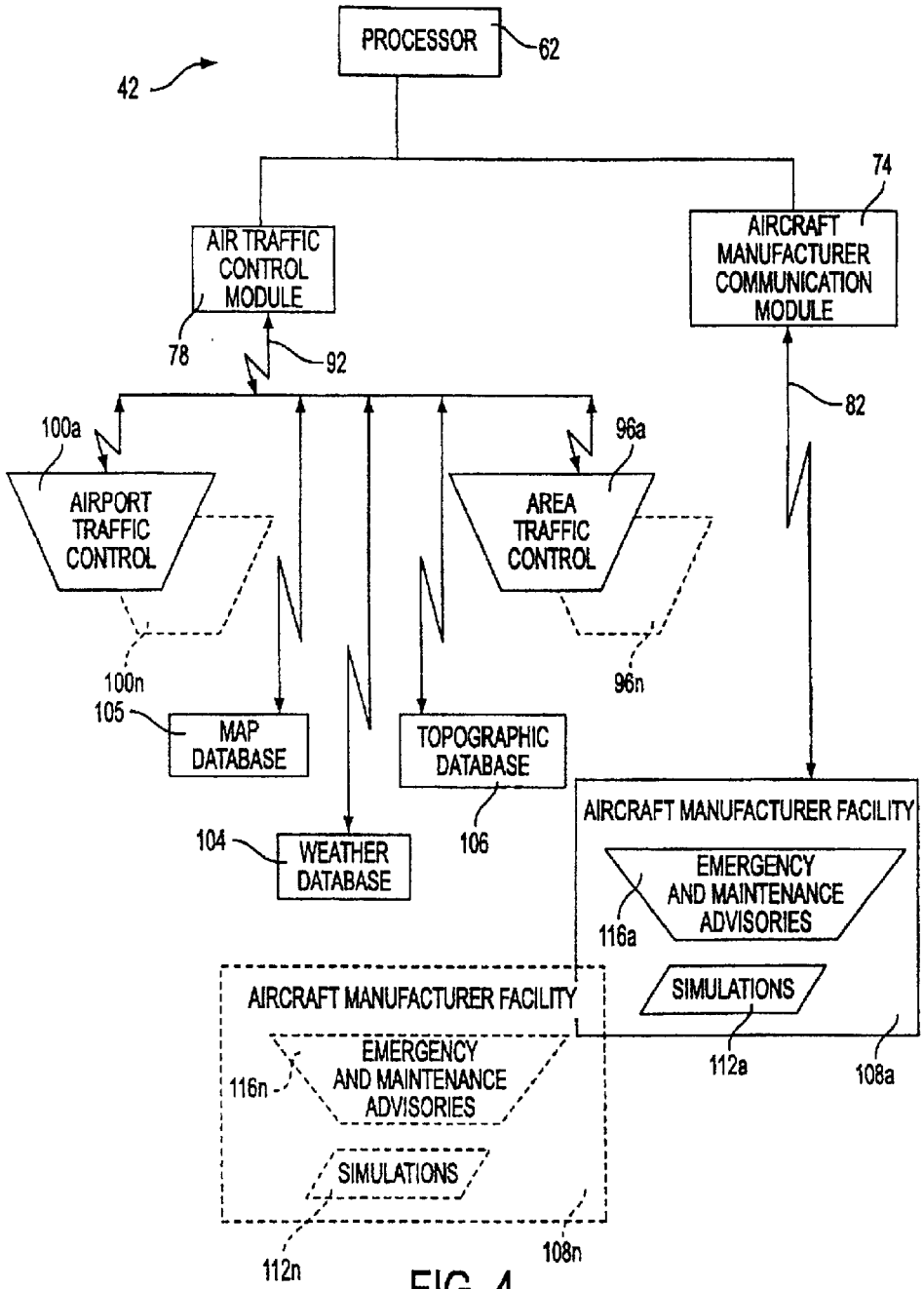
FIG. 4 is a block schematic of the Ground Based Distribution System according to the invention.

FIG. 4 provides greater detail about CGBS 42 communication with the ground based flight control and manufacturing facilities. The CGBS ground processor 62 communicates with the ATC communication module 78. Digital data is communicated serially over a wide band-width, fiber optic link 92 to the air traffic control facilities 100 and the area traffic control facilities 96. There are a large number of civil and military airport and area ATCs in present use. These are indicated 100a to 100n for the airport air traffic controllers and 96a to 96n for the area air traffic controllers. Each of the air traffic controllers 96, 100 can tap the wide band-width, fiber optic communication link 92 for the specific aircraft data of interest to them. The air traffic controllers can also send, to specific or to all SMART 14 equipped aircraft 10 in the world, advisory data over the same communication link.

The CGBS 42 communicates these advisories, via the satellite 38 communication link 48, 46, 34, to the aircraft 10. In a similar fashion the CGBS 42 receives world wide weather data from the weather bureau 104 and world wide map and topographic data from the map 105 and topographic 106 databases. The CGBS 42 then, by its knowledge of the aircraft location, flight plans and operational characteristics, tailors this global weather data to weather data that is specific to each aircraft's area of operation for safety and economy of flight advisories.

Aircraft manufacturing facilities 108 communicate with the CGBS 42 ground processor 62 via the aircraft manufacturer communication module's 74, wide band-width, fiber optic communication link 82. Since there are a number of different aircraft manufacturers they are indicated by reference numbers 108a to 108n. Their concomitant emergency and maintenance advisory facilities are indicated by the reference numbers 116a to 116n. Each manufacturer maintains an historical log of the aircraft 10 in service for configuration, stress, maintenance service and end of life assembly data. The manufacturers also maintain aircraft simulation capability 112 to aid in providing safety of flight advisories to aircraft 10 that are experiencing a problem. The different simulation facilities are shown by the reference numbers 112a to 112n. These advisories occur whether the problem was first surfaced by the in-air aircraft personnel, or by the on the ground monitoring personnel or by simulations at the CGBS 42 or aircraft manufacturer's facility 108.

The CGBS 42 and the aircraft manufacturer's facility 108 check the aircraft operational capability by remotely sampling the aircraft's operational status parameters 18, 22, 26, 44 and using other factors such as weather, ATC information, map, and DTED. The simulations utilize real-time analysis of the vehicle data and past performance to provide expert system advisories. For an aircraft that is experiencing a problem on the ground, the aircraft manufacturer's facilities 108 still sample the operational status of the aircraft's flight critical assemblies via the real-time, world wide, communication link 34, 46, 48. The manufacturer's facility 108 transmits expert system repair advisories to the aircraft's 10 maintenance personnel. These include the latest approved, problem specific, service manual data to efficiently and safely correct the aircraft's problem.

Operation of this invention, Remote Aircraft Flight Recorder and Advisory System, 50 can be summarized as follows. The aircraft 10 is fitted with a SMART module 14, that accepts sensor signals 18 depicting the performance of many of the flight safety critical assemblies. It converts any of the analog sensor data 18 into a digital format. These signals are the same as those that are presently sent to the existing flight crash recorders aboard aircraft which records vital flight information such as air speed, height, attitude, landing gear status, fuel status as well as the position of the aircraft controls and latitude and longitude, which is gleaned from radio navigation aids and the inertial navigation system (INS), when available. Unlike the existing crash recorder that must be recovered from a crash site to obtain an understanding of the cause of the crash, the system depicted in FIGS. 1–4 has a telemetry system to radio these signals to a world wide communication system and to a final destination known as the CGBS 42.

In addition to the standard flight sensors presently used in existing flight recorders, position and altitude 44 signals from the GPS or GLONASS receivers, acoustical sensors 22 that record cockpit sounds, and video camera data 26 that records the passengers entering the vehicle, the states of the cargo, hull and the cockpit during flight, aircraft identification and latest configuration are also sent to SMART 14 for telemetry to the CGBS 42. The SMART module 14 accepts these signals 18,22,26,44 and then transmits them over the uhf radio link 34, 46, 48. The preferred embodiment of this invention 50 utilizes a global satellite 38 communication system. The SMART module's 14 uhf output is sent to a satellite antenna 30 where the signal is radiated to a satellite 38 that is in a direct line of sight with the aircraft 10. The combined signal is then relayed, either by LEO or a synchronous orbit world wide communication satellite chain, until it is transmitted to the CGBS 42 by the communication satellite 38 that is in a direct line of sight with the CGBS antenna 54.

At the CGBS 42, these signals are archived. Also, aircraft data 18 and signals 22,26, 44 are distributed, utilizing fiber optic ground or satellite links, to flight controller facilities 100, 96 and to the aircraft manufacturers 108. It distributes the aircraft sensor data 18, 22, 26, 44 to them in real-time so as to solicit their expert analysis and help in generating the advisories. Real-time analysis of the pre-flight aircraft data along with other data such as weather 104, airport and its local area map 105, three dimensional topographical map information 106, from data bases such as Digital Terrain Elevation Data (DTED), ATC data, wind shear, and aircraft configuration are also used in generating advisories.

The SMART 14 also accepts advisory signals sent from the CGBS 42 to the aircraft 10. There are maintenance advisories and three types of in-flight advisories: emergency or safety of flight, flight efficiency or fuel economy, and flight separation. The SMART module 14 receives these signals and sends maintenance advisories to an on-board maintenance communication subsystem. In-flight advisories are sent to the pilot's audio system and to the pilot's warning panel. Thus SMART 14 concentrates the audio, video, digital discrete and sensor signals to minimize the weight, power expended, cost of equipment and uhf radio antennas carried aboard the aircraft.

Large, commercial, passenger aircraft will be fitted with systems 50 capable of monitoring an extensive number of their performance and control signals 18. Small, private aircraft do not need such extensive monitoring and will have systems 50 capable of monitoring only a limited number of performance and control signals 18.

The following reference numerals are used on FIGS. 1–4.

10 Aircraft
14 Sensor Multiplexer Receiver & Transmitter
16 GPS or GLONASS receiver
18 Aircraft performance and control data
22 Acoustic data
26 Video data
30 Telemetry antenna
32 GPS or GLONASS satellite
34 UHF signal
36 GPS or GLONASS uhf signal
38 Satellite
40 GPS antenna
42 Central Ground Based Processing Station
44 Position and altitude data
46 Inter-satellite uhf communication link
48 Satellite/CGBS uhf link
50 Remote Aircraft Flight Recorder And Advisory (RAFT) System
54 Receiving antenna
56 Antenna and uhf interface module
62 Processing station
64 Simulation module
66 Archive module
70 Advisories module
72 On-board advisory system
74 Aircraft manufacturer's communication module
76 Plug-in maintenance system input, output and display terminal
78 ATC communication module
82 Wide band link to aircraft manufacturers
86 Display and control system
92 Wide band link to ATC system
96a–n Air traffic control facilities
100a–n Area traffic control facilities
104 Global weather bureau
105 Map database
106 Topographic and Digital Terrain Elevation Data (DTED) database
108a–n Aircraft manufacturer's facilities
112a–n Aircraft manufacturer's simulation facilities
116a–n Aircraft safety advisories modules The remote aircraft flight recorder and advisory system 50 has been described with reference to a particular embodiment. Other modifications and enhancements can be made without departing from the spirit and scope of the claims that follow.

What is claimed is:

1. A global, paperless, aircraft maintenance system comprising:

an aircraft performance means for detecting aircraft performance and control parameters;

a maintenance communications means, located on board an aircraft, for providing maintenance advice to maintenance personnel;

a sensor multiplexer receiver and transmitter means, located on board said aircraft, for:

accepting said aircraft performance and control parameters; converting said aircraft performance and control parameters, when necessary, to digital form;

adding an aircraft identification and configuration label; converting said aircraft performance and control parameters and said identification and configuration label to an outgoing rf signal and broadcasting said outgoing rf signal; and receiving an incoming rf signal, converting it to a maintenance advisory, and feeding said maintenance advisory to said maintenance communication means;

an aircraft manufacturer's database means for providing aircraft data and maintenance information;

a central station means, located on the ground, for receiving said outgoing rf signal and converting it to said aircraft performance and control parameters and said aircraft identification and configuration label, and broadcasting said incoming rf signal;

a processing means, connected to said central station means, for:

archiving said aircraft performance and control parameters thus creating an archived data database;

combining said aircraft performance and control parameters with said aircraft data and said maintenance information;

generating said maintenance advisory *based upon said configuration label;* and converting said maintenance advisory to said incoming rf signal;

a display and control means, connected to said processing means, for displaying operation of said processing means and for allowing operator control of said processing means; and a global rf communications network means for conveying said outgoing signal from said aircraft to said central station means and conveying said incoming rf signal from said central station means to said aircraft.

2. A global, paperless, aircraft maintenance system comprising:

aircraft sensors which detect aircraft performance and control parameters;

means, located on board an aircraft, for providing maintenance advice to maintenance personnel;

a sensor multiplexer receiver and transmitter, located on board said aircraft, which:

accepts said aircraft performance and control parameters; converts said aircraft performance and control parameters, when necessary, to digital form;

adds an aircraft identification and configuration label; converts said aircraft performance and control parameters and said aircraft identification and configuration label to an outgoing rf signal and broadcasts said outgoing rf signal; and receives an incoming rf signal, converts it to a maintenance advisory, feeds said maintenance advisory to said [maintenance communications] means *for providing maintenance advice to maintenance personnel*;

an aircraft manufacturer's database for providing aircraft data and maintenance information;

a central station, located on the ground, which receives said outgoing rf signal and converts it to said aircraft performance and control parameters and said aircraft identification and configuration label, and broadcasts said incoming rf signal;

a processing means, connected to said central station, for:

archiving said aircraft performance and control parameters thus creating an archived data database;

combining said aircraft performance and control parameters with the archived data, and said aircraft data and maintenance information;

generating said maintenance advisory *based upon said configuration label*; and converting said maintenance advisory to said incoming rf signal;

a display and control subsystem, connected to said processing means, and a global rf communications network which conveys said outgoing signal from said aircraft to said central station and conveys said incoming rf signal from said central station to said aircraft.

3. A method of providing global, paperless, aircraft maintenance advisories comprising the steps of:

mounting a performance sensor in an aircraft;

mounting a control sensor in said aircraft;

mounting a means in said aircraft, for providing maintenance advice to maintenance personnel;

mounting a sensor multiplexer receiver and transmitter system, in said aircraft;

providing communications access to an aircraft manufacturer's database;

providing a central ground based station;

providing a processing means within said central ground based station;

providing a display and control subsystem, connected to said processing means;

providing a global, rf communications network;

accepting signals from said aircraft performance and control sensors into said sensor multiplexer receiver and transmitter;

converting, in said sensor multiplexer receiver and transmitter, said signals from said aircraft performance and control sensors, when necessary, to digital form;

adding an aircraft identification and configuration label;

converting said signals from said aircraft performance and control sensors, and said aircraft identification and configuration label, in said sensor multiplexer receiver and transmitter, to an outgoing rf signal;

transmitting said outgoing rf signal from said sensor multiplexer receiver and transmitter to said central ground base station via said global rf communications network;

receiving said outgoing rf signal at said central ground based station;

converting said outgoing rf signal at said ground based central station to said aircraft performance and control signals plus said aircraft identification and configuration label;

performing within said processing means the steps of:

archiving said aircraft performance and control signals thus creating an archived data database;

combining said aircraft performance and control signals with the archived data, and information from said aircraft manufacturer's database;

generating maintenance advisories *based upon said configuration label*; and converting said maintenance advisories to an incoming rf signal;

sending said incoming rf signal, via said global communications network, from said central ground based station to said sensor multiplexer receiver and transmitter;

converting said incoming rf signal, at said sensor multiplexer receiver and transmitter, to said maintenance advisories; and feeding said maintenance advisor[y]*ies* from said sensor multiplexer receiver and transmitter to said [maintenance communication] *means for providing maintenance advice to maintenance personnel*.

*4. An aircraft maintenance system for use on an aircraft having a flight data recorder, the maintenance system comprising:*

*a transmitter portable to be placed on an aircraft, said transmitter configured for transmission of digital aircraft performance data across a communication network while said aircraft is in flight; and*

*a central station connected to said communication network configured to receive and analyze said digital aircraft performance data to generate maintenance advice for said aircraft while said aircraft is in flight,*

*wherein said digital aircraft performance data includes an identifier unique to a particular aircraft and a configuration label, and at least a portion of said digital aircraft performance data comprises data directed to the flight data recorder.*

*5. The aircraft maintenance system of claim 4 further comprising:*

*a sensor multiplexer located on said aircraft, said sensor multiplexer having a plurality of inputs for receiving aircraft performance and control parameters from existing aircraft sensors, and an output in communication with said transmitter for providing said digital aircraft performance data to said transmitter.*

*6. The aircraft maintenance system of claim 4 wherein said digital aircraft performance data further includes digitized audio information.*

*7. The aircraft maintenance system of claim 4 wherein said digital aircraft performance data further includes digitized video information.*

*8. The aircraft maintenance system of claim 4 wherein said digital aircraft performance data includes aircraft position data directed to said flight data recorder.*

*9. The aircraft maintenance system of claim 8 wherein information provided by a GPS receiver is used in the calculation of said aircraft position data.*

*10. The aircraft maintenance system of claim 9 wherein information provided by an inertial navigation system is used in the calculation of said aircraft position data.*

*11. The aircraft maintenance system of claim 4, wherein said central station is further configured to digitally transmit said maintenance advice to said communication network, the aircraft maintenance system further comprising:*

*a receiver on said aircraft configured to receive digital data from said communication network; and*

*a maintenance communication means, located on said aircraft, for providing said maintenance advice to maintenance personnel, said maintenance communication means having an input for receiving said maintenance advice from said receiver.*

*12. The aircraft maintenance system of claim 11 wherein said maintenance advice is provided aurally to said maintenance personnel.*

*13. The aircraft maintenance system of claim 7 wherein said central station includes a storage system for storing said digital aircraft performance data.*

*14. An aircraft maintenance system comprising:*

*a transmitter positionable to be located on an aircraft, said transmitter configured for transmission of data across a communication network while said aircraft is in flight;*

*a ground based station connected to said communication network configured to receive and analyze said transmission of data, while said aircraft is in flight, to generate maintenance advice for said aircraft; and*

*a sensor multiplexer located on said aircraft, said sensor multiplexer having a plurality of inputs for receiving*

*aircraft performance and control parameters from aircraft sensors as said data and an output in communication with said transmitter for providing said data to said transmitter;*

*wherein said data further includes an aircraft identifier unique to a particular aircraft and a configuration label.*

*15. The aircraft maintenance system of claim 14, wherein said ground based station is further configured to transmit said maintenance advice to said communication network further comprising:*

*a receiver located on said aircraft, said receiver configured to receive said maintenance advice from said communication network; and*

*a maintenance communication means which receives said maintenance advice from said receiver and provides said maintenance advice to maintenance personnel.*

*16. The aircraft maintenance system of claim 14 wherein said ground based station includes a storage system for archiving said aircraft performance and control parameters.*

* * * * *